Oct. 16, 1934.  G. MacLEAN  1,976,955
FLUID TREATING APPARATUS
Filed Dec. 16, 1931   2 Sheets-Sheet 2

INVENTOR
Gordon MacLean
BY
Ramsey + Kent
his ATTORNEYS

Patented Oct. 16, 1934

1,976,955

UNITED STATES PATENT OFFICE 1,976,955

FLUID TREATING APPARATUS

Gordon MacLean, Flushing, N. Y., assignor to The Turbo-Mixer Corporation, New York, N. Y., a corporation of New York Application December 16, 1931, Serial No. 581,378

9 Claims. (Cl. 259—96)

This invention relates to treating apparatus of the type used for treatment of fluids. A few of the specific uses of the apparatus are the treatment of gasoline to remove gum-forming material or other undesired substances, treatment of lubricating oils, and heating or cooling of any fluid. The invention is primarily intended for continuous treatment, as opposed to batch treatment.

In almost any treatment of one material with another material or reagent, it takes a certain minimum time to cause the desired reaction or effect. As a specific example, take the treatment of gasoline with sulphuric acid to remove gum-forming materials. This may be accomplished (under certain conditions) in three minutes' time, but to do so requires that throughout the three minutes each elemental volume of gasoline be in contact with the proper quantity of finely divided sulphuric acid.

In batch procedure, the sulphuric acid and gasoline could be put in a tank and agitated for three minutes, at the end of which time the treatment of the batch would be completed. In continuous treatment, however, the problem arises of as nearly as possible keeping each elemental volume of gasoline within the treating tank or apparatus for a period of three minutes. It is obvious that if the gasoline (with the sulphuric acid mixed with it) was just flowed continuously into and out of a tank at a rate just sufficient to fill the tank in three minutes, a large part of the material would stay in the tank for more than three minutes and a large part would stay in much less than three minutes. This will be true in different degrees whether the contents of the tank be forcibly agitated or not. In practice forcible agitation is necessary to effect the desired intermixture of the substance so that is the case to be considered.

With the contents of a tank continuously agitated and a rate of flow into and out of the tank of ten gallons per minute, it would require a tank of at least 580 gallons capacity in order that not more than five per cent of the material would pass out of the tank in less than three minutes. It is apparent that this gives a size of tank having an apparent holding time of fifty eight minutes (at ten gallons per minute), which obviously is not economical as to the cost of the tank and the space required for it.

Attempts have been made to design more compact and less expensive apparatus for the continuous treatment of fluids, but such attempts have been only partially successful. In some of the apparata proposed, the desired treating time has not been obtained for a sufficiently large proportion of the entering material, and in others the structures have been too involved and expensive for satisfactory commercial use.

The general object of the present invention is to provide a simple, compact, and inexpensive treating apparatus for the continuous treatment of fluids.

Another object of the invention is to provide a fluid treating apparatus which will so control the flow through it that a relatively small ratio of average holding time to desired treating time will suffice to insure the treatment for the desired time of all of the material except a permissible small fraction.

A still further object of the invention is to provide a commercially practicable apparatus adapted for widely varying times of treatment of fluids.

It will be apparent that in addition to various local flows which may take place within a fluid treating apparatus, there is a main trend or flow into and out of the apparatus. For convenience, I refer to the main flow into and out of the apparatus as the "thru-put" of the apparatus.

Figure 1:
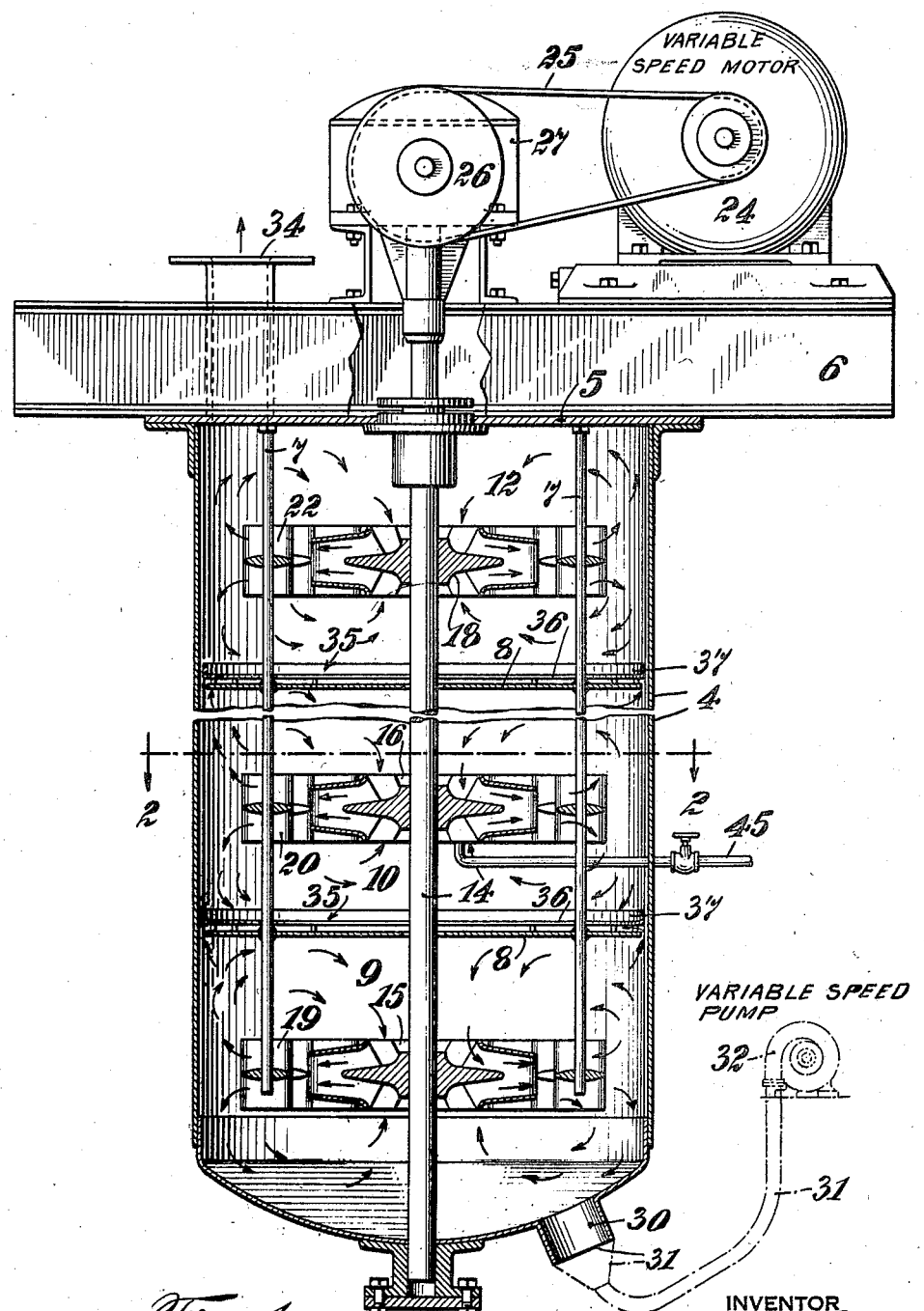
Fig. 1 is a vertical section (partially in elevation) showing treating apparatus of the present invention with the thru-put pump shown diagrammatically.

A generally cylindrical tank or casing 4 is closed by a cover 5 and suitably supported as by beams 6. Depending from the cover 5 is a plurality of supporting rods 7 to which are welded or otherwise attached at intervals a plurality of disc-like partitions 8 dividing the casing 4 into a series of compartments 9, 10, etc., and 12. Positioned centrally within the casing is a shaft 14 suitably journaled at each end and packed to prevent leakage from the tank. Centrally of the respective compartments the shaft 14 carries duplex turbo impellers 15, 16, etc., and 18 of known type. The impellers are surrounded respectively by flow directing stators 19, 20, etc., and 22 also of known type and suitably supported by rods 7.

The turbo impellers are adapted to be driven synchronously at varying speeds from variable speed motor 24, through belt 25, pulley 26, and gearing in gear box 27. It will be understood that in operation the tank 4 is normally full of liquid and each of the turbo impellers draws liquid from above and below it and discharges it tangentially outwardly toward the walls of the casing 4. The stators associated with the impellers have deflecting blades which act upon the outward discharge of the impellers, as is well understood in the art, to direct the flow in approximately radial directions, thereby preventing swirl in the tank.

The material to be treated is pumped into the tank at 30 through pipe 31 from centrifugal pump 32 (the pipe and pump being shown diagrammatically without regard to scale), passes from compartment to compartment and out at 34. Passages for the fluid from compartment to compartment are provided adjacent the periphery of each of the partitions 8. These partitions are also apertured at their centers, but the apertures are preferably just sufficient to give reasonable clearance for the shaft 14, and the total area of the clearance about the shaft 14 is preferably so small that any flow through at this point can be neglected. The clearance at the periphery of each of the partitions 8 may also be small, but the circumference is so large that the total area provides the necessary space for passage of the material from compartment to compartment, without objectionable loss of fluid head. It will be obvious that the thru-put of the apparatus is determined by the rate at which the material is delivered by pump 32 and that additional local flow within each of the compartments is induced by the turbo impellers 15, 16, etc., and 18.

Figure 3:
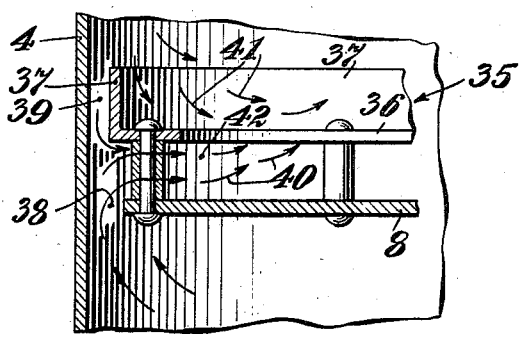
Fig. 3 is an enlarged detail section on line 3—3 of Fig. 2.

Flow through the annular space at the periphery of each partition is controlled by the construction shown to best advantage in Fig. 3, in such manner as to prevent retrogression from compartment to compartment. Spaced from, but mounted adjacent the periphery of each plate 8, is an annular member 35 of angular cross section, having one leg 36 parallel to partition 8 and the other leg 37 parallel to the side of the casing 4. A portion of the flow from a lowermost impeller enters annular space 38, and a portion of the flow from an uppermost impeller enters annular space 39. The flow thru spaces 38 and 39 combines and passes in the direction indicated by the arrows 40. Space 39 is less than space 38. A portion of the flow from the uppermost impeller is split off by leg 37, thereby causing it to sweep in a generally curved direction as indicated by the arrows 41. This produces at 42 an aspirating effect or low pressure area, which insures that all of the flow through spaces 38 and 39 will pass inwardly above partition 8. Thus the thru-put of the tank will progress upwardly from compartment to compartment without any retrogression.

It may be noted that the ideal theoretical shape to produce the maximum aspirating effect at zone 42 would be a curved surface from the upper edge to the inner edge of element 35. Such a curved surface, however, would be expensive to produce commercially, and the angle-iron cross section produces sufficient aspirating effect for practical purposes and is a much less expensive construction. I have found that for certain purposes very satisfactory results are produced in a tank two feet in diameter by making the clearance at 38 one-half inch, the clearance at 39 one-quarter inch, and the space between plate 8 and the horizontal leg 36 three quarters of an inch.

The impellers are run at such speed as to effect vigorous re-circulation of the material in each compartment, so that the material is locally circulated a number of times by each impeller before it passes to the next compartment. The rate of local or impeller flow is usually at least twice the rate of thru-put, and in the vast majority of cases is ten times the rate of thru-put.

It will be apparent that since the material is treated in successive stages with vigorous re-circulation in each stage, and is controlled between stages to prevent retrogression, that there can be no hasty exit of any elemental volume of material entering the treater. Thus treatment of virtually all of the material for the required time is assured even with a small apparatus. It was previously pointed out that with a simple tank (even if agitated) a 580 gallon tank would be required for a thru-put of ten gallons per minute to insure that not more than five per cent of the material would get through in less than three minutes. It can be shown that with a three stage treater of the present invention, a seventy gallon total capacity will insure that not more than five per cent of the material will get through in three minutes, with a thru-put of ten gallons per minute. This is less than one eighth the size of a simple tank, which obviously effects a tremendous practical saving in the cost of equipment and the space required to utilize it.

It will be obvious that the invention can be used in various ways and for many purposes; for example, the tank has been illustrated in a vertical position, but it may be also used in a horizontal position. Any desired number of stages may be used. The invention has been described with particular reference to contact treatment, as in the case of the treatment of gasoline with sulphuric acid. In such case, the gasoline and sulphuric acid would be pumped into the treater through the same entrance 30 and after passing out of the treater would be passed to settling tanks to permit the resultant sludge to settle. I have found that in many instances the desired reaction is facilitated by the presence of a gas and in such instances the desired gas may be introduced through a pipe 45. I have found the introduction of gas to be helpful in treating gasoline with sulphuric acid, but on account of the inflammable nature of gasoline, a gas free of oxygen should be used.

The invention may also be used with equal advantage in non-contact treatment, as in heat exchange. For such purposes tank 4 would be jacketed, preferably with a separate jacket for each compartment.

A great practical advantage of the present invention is that without adjustment of parts it can be used satisfactorily for different lengths of treatment. The impeller speeds may remain the same while the thru-put is changed to give the desired treating time, by varying the speed of pump 32. In some instances the impeller speeds may also be varied. I have found that without any adjustment or variation in size or location of parts one apparatus may be satisfactorily used at rates varying from ten to one thousand gallons per minute.

Figure 2:
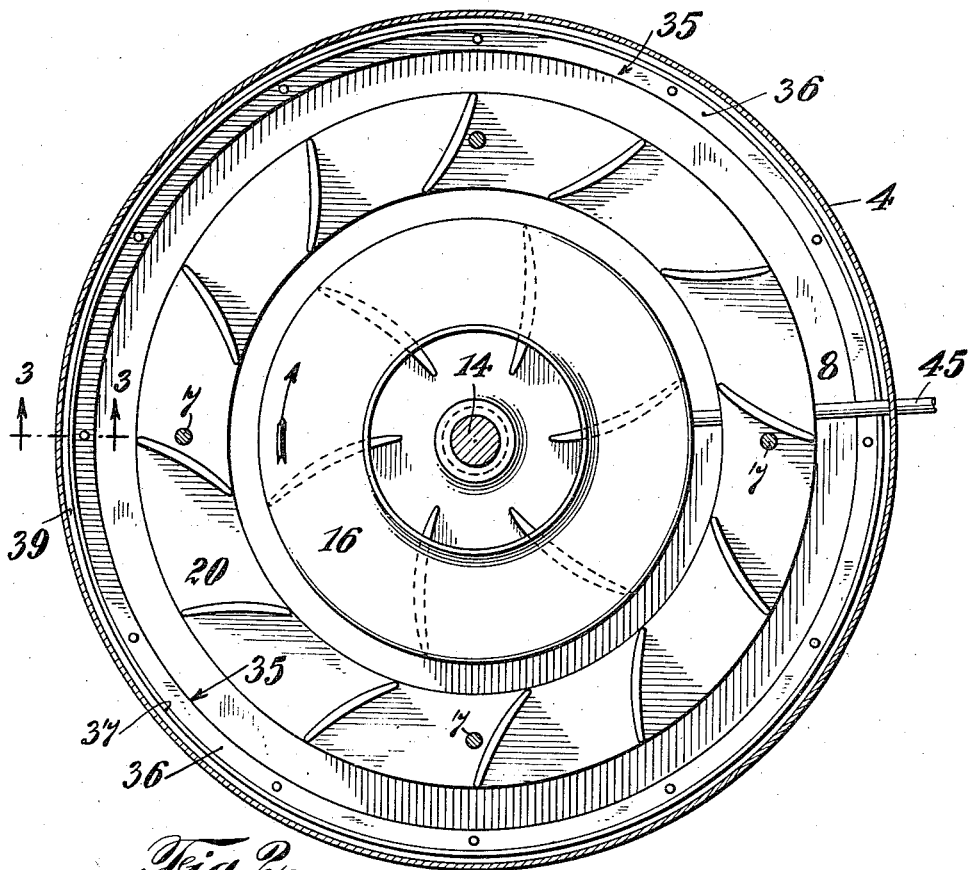
Fig. 2 is a section on line 2—2 of Fig. 1.

For most purposes the impellers are run in the normal direction, i. e., in the direction indicated by the arrow in Fig. 2. However, where extremely fine break-up and intermixture of the treating agent with the material is desired, the impellers may be run in the reverse direction. For the treatment of gasoline, I prefer to run the propellers as indicated by the arrow in Fig. 2, while for the treatment of still residues I prefer to run the impellers in the reverse direction.

The present invention may obviously be embodied in various forms and hence the disclosure is merely illustrative in compliance with the patent statutes and is not to be considered as limiting.

Having thus described my invention, what I claim is:

1. In combination; a casing; partitions dividing said casing into a series of compartments, there being adjacent the edge of each partition an annular passage for progression of the fluid from compartment to compartment; means to establish a through-put from compartment to compartment; means to induce local flow radially outward within each compartment; and means to direct the flow at the annular passages to prevent retrogression of the fluid from compartment to compartment.

2. Apparatus for continuously treating liquids comprising a generally cylindrical casing; disc-like partition means dividing the casing into at least two generally cylindrical compartments, there being an annular space near the periphery of the partition means to permit progression of the liquid from compartment to compartment; and a duplex turbo impeller within each compartment.

3. Apparatus for continuously treating liquids comprising a generally cylindrical casing; disc-like partition means dividing the casing into at least two generally cylindrical compartments, there being an annular space near the periphery of the partition means to permit progression of the liquid from compartment to compartment; a duplex turbo impeller within each compartment; and flow controlling means adjacent said annular space to prevent retrogression of liquid from compartment to compartment.

4. Apparatus of the class described comprising a casing; a plurality of rods supported in the casing and extending longitudinally thereof and spaced from the wall of the casing; at least one disc-like partition supported by said rods, the periphery of the partition being spaced from the wall of the casing; a shaft passing through said partition; and at least two centrifugal impellers on said shaft, one on each side of said partition.

5. Apparatus of the class described comprising a casing; a plurality of rods supported in the casing and extending longitudinally thereof and spaced from the wall of the casing; at least one disc-like partition supported by said rods; a shaft passing through said partition; at least two turbo impellers on said shaft, one on each side of said partition; and a flow directing stator for each impeller, the stators being supported by said rods.

6. Apparatus of the class described comprising a casing; at least one disc-like partition dividing said casing into at least two compartments, said partition having its periphery spaced from the wall of the casing; and an annular member of angle-shaped cross section positioned adjacent the periphery of said partition, said annular member having one leg spaced from said partition and the other leg spaced from the wall of the casing.

7. Apparatus of the class described comprising a casing; at least one disc-like partition dividing said casing into at least two compartments, said partition having its periphery spaced from the wall of the casing; means to induce outward flow in each of said compartments and an annular member of angle-shaped cross section positioned adjacent the periphery of said partition, said annular member having one leg spaced from said partition and the other leg spaced from the wall of the casing.

8. Apparatus of the class described comprising a casing; at least one transverse partition dividing said casing into at least two compartments, there being an annular flow space near the periphery of said partition; means acting centrifugally to induce in each compartment flow outwardly toward the casing and thence longitudinally of the casing toward the partition; and means on one side of the partition to deflect the flow to produce a low pressure zone.

9. Apparatus for continuously treating liquids comprising a closed generally cylindrical casing; means to conduct to the casing the material to be treated; transverse partition means dividing the casing into at least two compartments, there being annular space adjacent the periphery of the partition means to permit the liquid to progress from compartment to compartment; flow controlling means adjacent said annular space to prevent retrogression of liquid from compartment to compartment; and means within successive compartments to locally circulate the liquid therein.

GORDON MacLEAN.